(12) United States Patent
Gong et al.

(10) Patent No.: US 9,143,268 B2
(45) Date of Patent: *Sep. 22, 2015

(54) TECHNIQUES FOR UL MU MIMO SIGNALING AND ERROR HANDLING

(71) Applicants: Michelle X. Gong, Sunnyvale, CA (US); Robert J. Stacy, Portland, OR (US)

(72) Inventors: Michelle X. Gong, Sunnyvale, CA (US); Robert J. Stacy, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/151,113

(22) Filed: Jan. 9, 2014

(65) Prior Publication Data

US 2014/0204858 A1 Jul. 24, 2014

Related U.S. Application Data

(63) Continuation of application No. 12/877,413, filed on Sep. 8, 2010, now Pat. No. 8,649,358.

(51) Int. Cl.
| H04L 12/413 | (2006.01) |
| H04L 1/00 | (2006.01) |
| H04B 7/04 | (2006.01) |
| H04W 72/02 | (2009.01) |
| H04W 28/04 | (2009.01) |

(52) U.S. Cl.
CPC ............ *H04L 1/0022* (2013.01); *H04B 7/0452* (2013.01); *H04L 1/0003* (2013.01); *H04L 1/0009* (2013.01); *H04L 1/0025* (2013.01); *H04W 72/02* (2013.01); *H04W 28/04* (2013.01)

(58) Field of Classification Search
None
See application file for complete search history.

(56) References Cited

U.S. PATENT DOCUMENTS

| 8,340,062 | B2 | 12/2012 | Tan et al. |
| 8,649,358 | B2 * | 2/2014 | Gong et al. ............... 370/338 |
| 2006/0256742 | A1 | 11/2006 | Lee et al. |
| 2007/0237104 | A1 | 10/2007 | Alon et al. |
| 2007/0242621 | A1 | 10/2007 | Nandagopalan et al. |
| 2009/0213815 | A1 | 8/2009 | Sherman et al. |
| 2009/0239565 | A1 | 9/2009 | Han et al. |
| 2009/0262695 | A1 | 10/2009 | Chen et al. |
| 2010/0027456 | A1 | 2/2010 | Onggosanusi et al. |
| 2010/0220679 | A1 | 9/2010 | Abraham et al. |

(Continued)

FOREIGN PATENT DOCUMENTS

| EP | 1983676 A1 | 10/2008 |
| WO | 2009/027931 A2 | 3/2009 |
| WO | 2012/033665 A1 | 3/2012 |

OTHER PUBLICATIONS

International Preliminary Report on Patentability and Written Opinion received for PCT Patent Application No. PCT/US2011/049600, mailed on Mar. 21, 2013, 8 Pages.

(Continued)

*Primary Examiner* — Anh-Vu Ly
(74) *Attorney, Agent, or Firm* — Ellis B. Ramirez; PRASS LLP

(57) ABSTRACT

An embodiment of the present invention provides a wireless station (STA), comprising a transceiver operable for communicating in a wireless network, wherein the transceiver is adapted to use signaling that enables the wireless station to communicate necessary information including a desired modulation coding scheme (MCS).

13 Claims, 3 Drawing Sheets

(56) References Cited

U.S. PATENT DOCUMENTS

| | | |
|---|---|---|
| 2010/0329195 A1 | 12/2010 | Abraham et al. |
| 2011/0149723 A1 | 6/2011 | Gong et al. |
| 2011/0268054 A1 | 11/2011 | Abraham et al. |
| 2011/0268094 A1 | 11/2011 | Gong et al. |
| 2012/0106371 A1* | 5/2012 | Abraham et al. ............. 370/252 |
| 2012/0320856 A1 | 12/2012 | Kim et al. |

OTHER PUBLICATIONS

International Search Report and Written Opinion received for PCT Patent Application No. PCT/US2011/049600, mailed on Feb. 17, 2012, 10 Pages.

Office Action received for Korean Application No. 10-2013-7006813, mailed on Mar. 25, 2014, 7 pages of Office Action Including 3 page of English Translation.

* cited by examiner

TECHNIQUES FOR UL MU MIMO SIGNALING AND ERROR HANDLING

RELATED APPLICATION

The present patent application is a continuation patent application of U.S. patent application Ser. No. 12/877,413, filed Oct. 8, 2010, entitled "TECHNIQUES FOR UL MU MIMO SIGNALING AND ERROR HANDLING," the disclosure of which is incorporated by reference herein.

BACKGROUND

It is possible to increase the network capacity of a basic service set (BSS) in wireless networks using Uplink (UL) Multi-user Multiple Input, Multiple Output (MU MIMO) techniques. With UL MU MIMO, multiple STAs are permitted to simultaneously (in time and frequency) transmit to a multiple-antenna access point (AP); the resulting signals are separated by the AP's MIMO equalizer.

To facilitate UL MU MIMO transmissions, an AP schedules uplink transmissions from multiple STAs based on information communicated from STAs. However, presently there are no signaling mechanisms for a wireless station (STA) operating in wireless networks to notify the AP of relevant information for UL MU MIMO transmissions and an error handling mechanism that differentiates packet errors due to interference and noise from packet errors from collisions.

Thus, a strong need exists for techniques to solve MAC signaling problems to support Uplink Multi-User MIMO (UL MU MIMO) transmissions.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
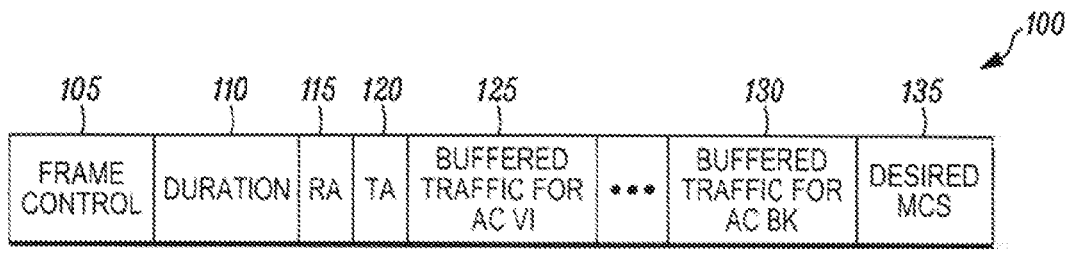
FIG. 1 provides an example frame format of Request to Transmit (RTX) according to embodiments of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the preset invention may be practiced without these specific details. In other instances, well-known methods, procedures, components and circuits have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Embodiments of the present invention provide a signaling mechanism that enables a wireless station (STA) to communicate necessary information, such as a desired modulation coding scheme (MCS) and access category (AC) with the AP. Further, embodiments of the present invention may provide an error handling mechanism for uplink multiuser multiple input multiple output wireless stations (UL MU MIMO STAs).

An UL MU MIMO-capable STA contends for the medium using Enhanced Distribution Channel Access (EDCA). After the STA wins the contention, it transmits a Request To Transmit (RTX) frame to the AP. The RTX frame contains the buffered traffic information per AC, the desired MCS for the upcoming UL MU MIMO transmission, and the desired AC number for the upcoming UL MU MIMO transmission.

Turning now to FIG. 1, shown generally as 100, is an example frame format of RTX. It may include frame control 105, duration 110, RA 115, TA 120 Buffered traffic 12 for AC VI 125, buffered traffic for AC BK 130, and desired MCS 135. It is noted that the desired MCS field 135 is the mandatory fields in the RTX frame, whereas buffered traffic fields 125 and 130 are optional. The buffered traffic fields 125 and 130 indicate the remaining buffered traffic after the upcoming UL MU MIMO transmission.

Figure 2:
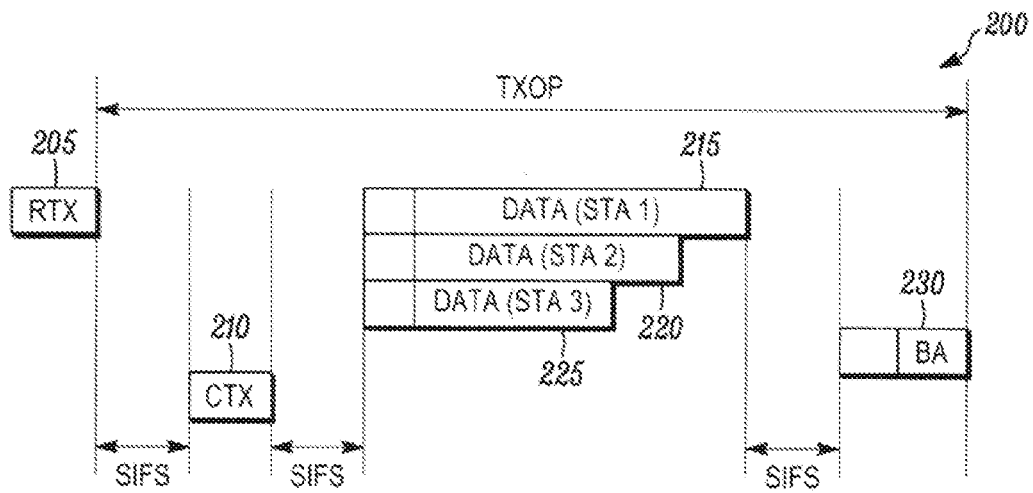
FIG. 2 is an illustration of UL MU MIMO TXOP according to embodiments of the present invention.

Based on the desired MCS and the buffered traffic information, the STA calculates the duration of the TXOP. The duration field in the RTX sets the duration of the TXOP. Upon receiving the RTX frame, the AP replies with a Clear To Transmit (CTX) frame. FIG. 2 at 200 illustrates the procedure of an UL MU MIMO TXOP. A STA, (i.e. STA1) transmits a RTX 205 to the AP. The RTX 205 initiates a TXOP. After the AP transmits a CTX 210 that includes a multi-cast address or a broadcast address as RA, STAs that were polled by the CTX transmit data frames 215, 220 and 225 based on the information indicated in the CTX frame 210. After receiving one or more frames correctly, the AP replies with one or more BAs 230.

Within the CTX frame 210, the AP includes a list of STAs' AIDs, max MCS or stream number for each STA, and the AC number for the upcoming UL MU MIMO transmissions.

Figure 3:
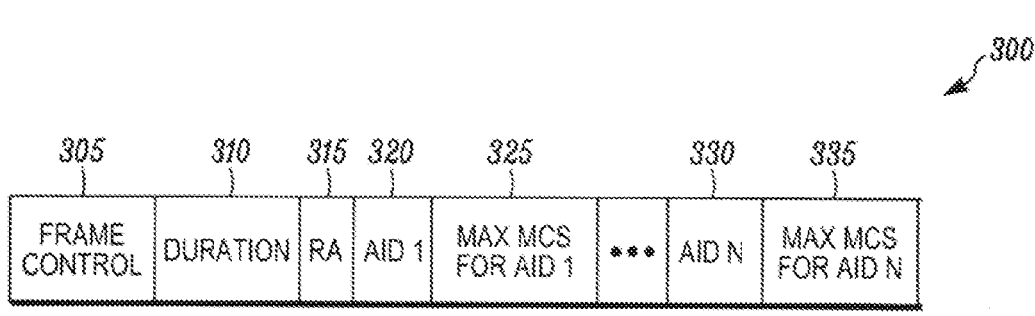
FIG. 3 provides a first example frame format of a Clear to Transmit (CTX) according to embodiments of the present invention.

FIG. 3 at 300 provides a first example frame format of a Clear to Transmit (CTX) according to embodiments of the present invention. It may include frame control 305, duration 310, RA 315, AID1 320, Max MCS for AID 1 325, AID N 330, and Max MCS for AIDN 335.

Figure 4:
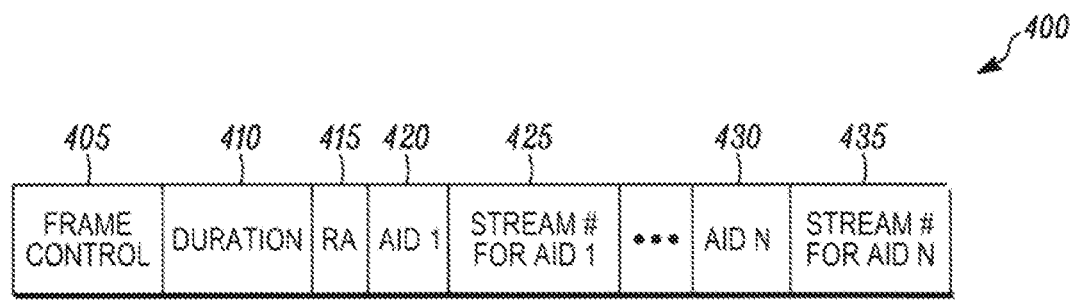
FIG. 4 provides a second example frame format of a Clear to Transmit (CTX) according to embodiments of the present invention.

FIG. 4 at 400 provides a second example frame format of a Clear to Transmit (CTX) according to embodiments of the present invention. This embodiment may include frame control 405, duration 410, RA 415, AID1 420, Stream number for AID 1 425, AID N 430, and Stream number for AID N 435.

Figure 5:
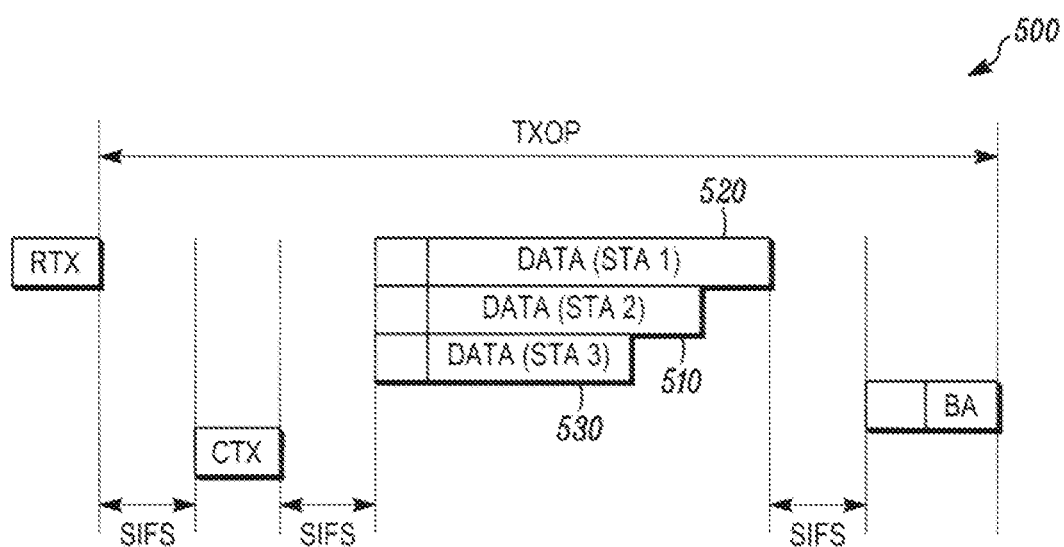
FIG. 5 shows an illustration of UL MU MIMO TXOP (error handling) according to embodiments of the present invention.

Turning now to FIG. 5 at 500 is an illustration of UL MU MIMO TXOP (error handling) according to embodiments of the present invention. FIG. 5 depicts an example when one of the UL MU MIMO transmissions is not received correctly. If STA 2 does not receive a BA for itself (shown as 510 with the Data for ST2 crossed off) but has received BAs for other STAs (for example, Data (STAT) 520 and Data (STA3) 530) from the AP, the STA should initiate success backoff by setting CW=CWmin. This is because if the AP can decode any of the data frame in the UL MU MIMO transmission and send back at least one BA, there is no collision at the AP. Thus, the most likely cause for packet corruption is due to interference, channel variation and noise. The STA should not initiate exponential backoff in this case. Similarly, if a STA has more traffic to send and it has received at least one BA from the AP even if the BA is not intended for itself, it can initiate success backoff. If no BA is received from the AP, the STA initiates exponential backoff.

Figure 6:
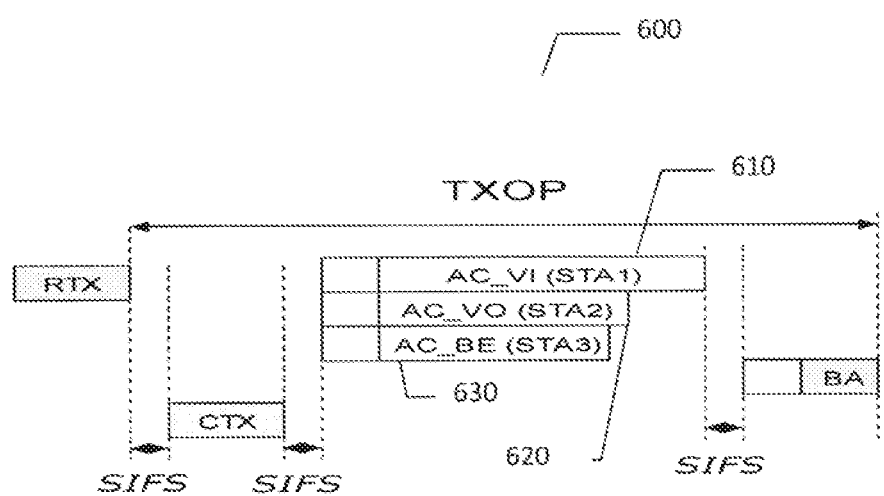
FIG. 6 shows an illustration of different access categories (ACs) that may be included in UL MU MIMO TXOP according to embodiments of the present invention.

Looking now at FIG. 6 is an illustration that shows that different access categories (ACs) may be included in the same UL MU MIMO transmission 600. AC_VI 610: video access category, AC_VO 620: voice access category, and AC_BE 630: best effort access category. Although not illustrated herein, AC_BK (background access category) may be provided as an embodiment of the present invention.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. A wireless station (STA), comprising:
a transceiver operable for communicating in a wireless network, wherein said transceiver is adapted to use signaling that enables said wireless station to communicate necessary information including a desired modulation coding scheme (MCS);
wherein said transceiver enables error handling at said transceiver if the wireless station (STA) is an uplink multi user multiple input multiple output (UL MU MIMO) wireless station;
wherein error handling is initiating success backoff or exponential backoff when at least one UL MU MIMO transmission is not received correctly;
wherein said transceiver is capable of communicating with an access point (AP) in said wireless network and is capable of sending to said AP a Clear To Transmit (CTX) frame, said CTX frame including a list of STAs' association identifications (AIDs), and max MCS or stream number for each STA;
wherein when one UL MU MIMO transmission from said STA to said access point (AP) is not received correctly, if an additional wireless station communicating in said wireless network does not receive a block acknowledgment (BA) for itself but has received BAs for other STAs from said AP, said STA will initiate a success backoff by setting contention window (CW)=CWmin since said AP can decode any data frame in said UL MU MIMO transmission and send back at least one BA if there is no collision at the AP, thereby said STA should not initiate exponential backoff, and wherein if said STA has more traffic to send and has received at least one BA from said AP even if said BA is not intended for itself, it can initiate success backoff and if no BA is received from said AP, said STA initiates exponential backoff.

2. The wireless station of claim 1, wherein said transceiver is further adapted to include in said UL MU MIMO transmission one or more of the following access categories (AC): AC_VI : video access category, AC_VO: voice access category, AC_BE 630: best effort access category, and AC_BK: background access category.

3. The wireless station of claim 2, wherein said error handling differentiates packet errors due to interference and/or noise from collisions.

4. The wireless station of claim 3, wherein said transceiver uses a Request To Transmit (RTX) frame and wherein said frame contains buffered traffic information per access categories and said desired MCS for an upcoming UL MU MIMO transmission.

5. A method comprising:
operating a transceiver in a wireless network and adapting said transceiver to use signaling that enables a wireless station (STA) to communicate necessary information including a desired modulation coding scheme (MCS);
enabling error handling at said transceiver if the wireless station (STA) is an uplink multi user multiple input multiple output (UL MU MIMO) wireless station;
wherein error handling is initiating success backoff or exponential backoff when at least one UL MU MIMO transmission is not received correctly;
wherein said STA is capable of communicating with an access point (AP) in said wireless network and is capable of sending to said AP a Clear To Transmit (CTX) frame, said CTX frame including a list of STAs' AIDs, and max MCS or stream number for each STA;
wherein when one UL MU MIMO transmission from said STA to said AP is not received correctly, if an additional wireless station communicating in said wireless network does not receive a BA for itself but has received BAs for other STAs from said AP, said STA will initiate a success backoff by setting contention window CW=CWmin since said AP can decode any data frame in said UL MU MIMO transmission and send back at least one BA if there is no collision at the AP, thereby said STA should not initiate exponential backoff, and wherein if said STA has more traffic to send and has received at least one BA from said AP even if said BA is not intended for itself, it can initiate success backoff and if no BA is received from said AP, said STA initiates exponential backoff.

6. The method of claim 5, further comprising said error handling differentiating packet errors due to interference and/or noise from collisions.

7. The method of claim 6, wherein said STA uses a Request To Transmit (RTX) frame and wherein said frame contains buffered traffic information per access categories, and said desired MCS for an upcoming UL MU MIMO transmission.

8. A base station (BS), comprising:
a transceiver adapted for communication with a wireless station (STA) in a wireless network, said STA adapted to use signaling that enables said STA to communicate necessary information including a desired modulation coding scheme (MCS) to said BS;

wherein said transceiver enables error handling at said transceiver if the wireless station (STA) is an uplink multi user multiple input multiple output (UL MU MIMO) wireless station;

wherein error handling is initiating success backoff or exponential backoff when at least one UL MU MIMO transmission is not received correctly;

wherein when one UL MU MIMO transmission from said STA to said BS is not received correctly, if an additional wireless station communicating in said wireless network does not receive a block acknowledgment (BA) for itself but has received BAs for other STAs from said BS, said STA will initiate a success backoff by setting contention window CW=CWmin since said BS can decode any data frame in said UL MU MIMO transmission and send back at least one BA if there is no collision at the BS, thereby said STA should not initiate exponential backoff, and wherein if said STA has more traffic to send and has received at least one BA from said BS even if said BA is not intended for itself, it can initiate success backoff and if no BA is received from said BS, said STA initiates exponential backoff.

9. The BS of claim 8, wherein said error handling differentiates packet errors due to interference and/or noise from collisions.

10. A non-transitory computer readable medium encoded with computer executable instructions, which when accessed, cause a machine to perform operations comprising:

operating a transceiver in a wireless network and adapting said transceiver to use signaling that enables a wireless station (STA) to communicate necessary information including a desired modulation coding scheme (MCS);

enabling error handling at said transceiver if the wireless station (STA) is an uplink multi user multiple input multiple output (UL MU MIMO) wireless station;

wherein error handling is initiating success backoff or exponential backoff when at least one UL MU MIMO transmission is not received correctly;

wherein when one UL MU MIMO transmission from said STA to an access point (AP) is not received correctly, if an additional wireless station communicating in said wireless network does not receive a block acknowledgment (BA) for itself but has received BAs for other STAs from said AP, said STA will initiate a success backoff by setting contention window CW=CWmin since said AP can decode any data frame in said UL MU MIMO transmission and send back at least one BA if there is no collision at the AP, thereby said STA should not initiate exponential backoff, and wherein if said STA has more traffic to send and has received at least one BA from said AP even if said BA is not intended for itself, it can initiate success backoff and if no BA is received from said AP, said STA initiates exponential backoff.

11. The non-transitory computer readable medium of claim 10, further comprising said error handling differentiating packet errors due to interference and/or noise from collisions.

12. The non-transitory computer readable medium of claim 11, wherein said STA uses a Request To Transmit (RTX) frame and wherein said frame contains buffered traffic information per one or more access categories (AC), said desired MCS for an upcoming UL MU MIMO transmission, and a desired AC number for an upcoming UL MU MIMO transmission.

13. The non-transitory computer readable medium of claim 12, wherein said STA is capable of communicating with an access point (AP) in said wireless network and is capable of sending to said AP a Clear To Transmit (CTX) frame, said CTX frame including a list of STAs' AIDs, max MCS or stream number for each STA, and said desired AC number for the upcoming UL MU MIMO transmissions.

* * * * *